M. Coney,
6471X
Water Wheel.
Patented Apr. 12, 1831.
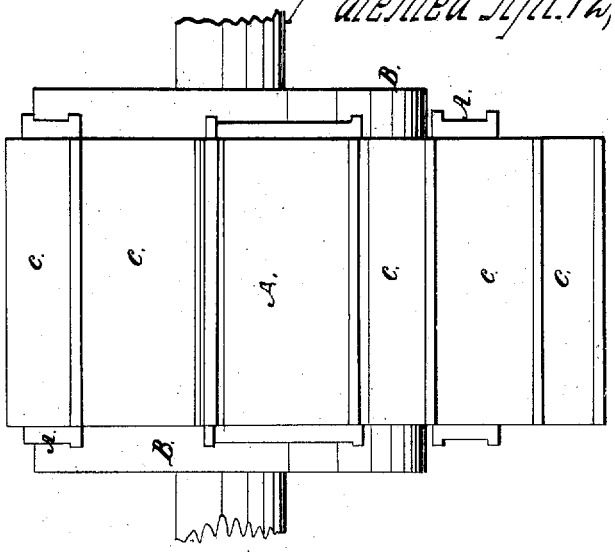
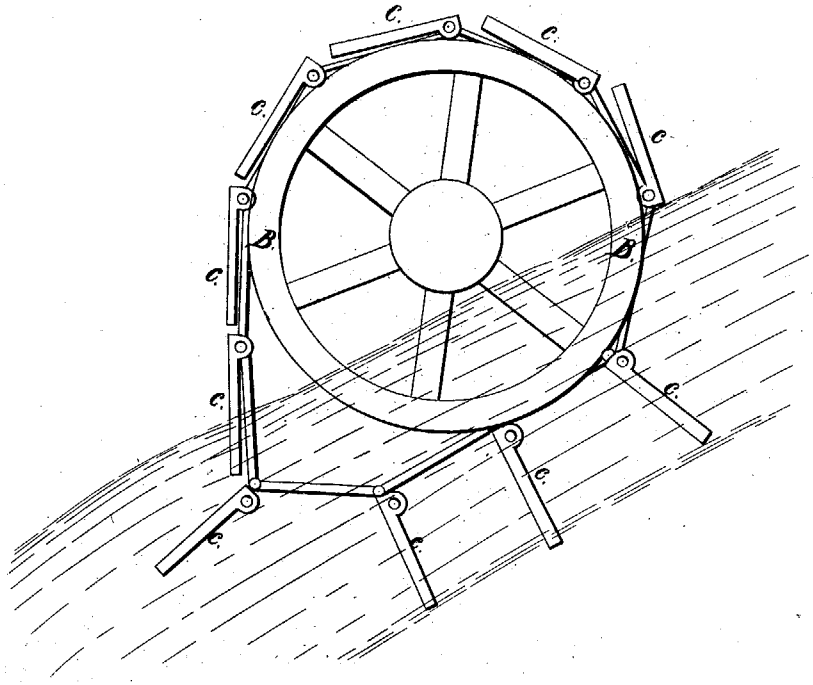
N. PETERS, PHOTO-LITHOGRAPHER, WASHINGTON, D. C.

Apl. 12. 1831 163.

6471X

Martin Coney of Portland, State of N. York.

Letters Patent,

The schedule referred to in these Letters Patent and making part of the same, containing a description, in the words of the said Martin Coney himself of his Improvement in the Water Wheel.

To all to whom these presents shall come Be it known that I Martin Coney, of the Town of Portland in the County of Chautauque and State of New York, have invented a new and useful improvement in the water wheel, and that the following is a full and exact description of the construction and operation of the said machine as invented or improved by me, — A self geered chain Water Wheel, or power for the use of large streams (or small ones with high falls) to be used in any position from a horizontal to a perpendicular of which the following is a description, a chain or strap of any length passing around a shaft or cylinder, of the same or different sizes, with buckets attached to the chain or strap for the reception of the water, the buckets or floats, attached to the strap or chain to be fastened with an iron or other substantial hinge and let into the water (when the wheel is horizontal or on an inclined plane) by a chain of a length sufficient to receive the power of the water; as the buckets or floats pass or are lifted out of the water by the turning of the shaft or cylinder to which they are attached, they fall down, and lie close to the cylinder or wheel until they approach the water again, When the water is applied from a water fall to the chain water wheel, the buckets may be fixed and stationary Witness. D. G. Garnsey
David Eaton Martin Coney

[illegible]